(12) United States Patent
Ganje et al.

(10) Patent No.: US 11,469,882 B2
(45) Date of Patent: Oct. 11, 2022

(54) OPTIMIZED CONVOLUTION FOR RECEIVED XOR ENCRYPTED DATA STREAMS

(71) Applicant: Rockwell Collins, Inc., Cedar Rapids, IA (US)

(72) Inventors: Stephen A. Ganje, Frisco, TX (US); Christopher M. Trebisovsky, Wylie, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 7 days.

(21) Appl. No.: 17/225,926

(22) Filed: Apr. 8, 2021

(65) Prior Publication Data

US 2021/0328768 A1 Oct. 21, 2021

Related U.S. Application Data (60) Provisional application No. 63/011,899, filed on Apr. 17, 2020.

(51) Int. Cl.
*H04L 9/06* (2006.01)
*G06F 17/14* (2006.01)
(Continued)

(52) U.S. Cl.
CPC ............ *H04L 9/065* (2013.01); *G06F 17/142* (2013.01); *G06F 21/72* (2013.01); *H04L 9/0825* (2013.01)

(58) Field of Classification Search
CPC ......... H04L 9/065; H04L 9/0825; H04L 9/12; G06F 17/142; G06F 21/72; G06F 21/725
See application file for complete search history.

(56) References Cited

U.S. PATENT DOCUMENTS

| 5,592,553 A * | 1/1997 | Guski ................... H04L 9/0822 380/29 |
| 8,406,319 B2 | 3/2013 | Sayana et al. |

(Continued)

FOREIGN PATENT DOCUMENTS

IN 5827CHENP2009 A 10/2008

OTHER PUBLICATIONS https://tutorialspoint.com/digital_signal_processing/dsp_discrete_fourier_transform_sectional_convolution.htm, DSP-DFT Sectional Convolution—Tutorialspoint, Sep. 6, 2010, 3 pages.
(Continued)

*Primary Examiner* — Carl G Colin
*Assistant Examiner* — Hany S. Gadalla
(74) *Attorney, Agent, or Firm* — Suiter Swantz pc llo (57) ABSTRACT

A receiver apparatus and method for optimized decryption and despreading of a very low frequency (VLF) bitstream is disclosed. In embodiments, the receiver includes antenna elements for receiving a transmission security (TRANSEC) encoded bitstream associated with an uncertainty window size and a spread factor. The receiver includes cryptographic processors that, when the spread factor is sufficiently large, select key section numbers A and data section numbers B based on the window size and spread factor. The cryptographic processors generate an output sequence of correlation windows, each correlation window associated with a symbol of the bitstream, via pipelined sectional mirrored-key convolution based on a key section number A and data section number B chosen to optimize performance (e.g., processor performance, memory performance).

15 Claims, 6 Drawing Sheets

(51) Int. Cl.
    *G06F 21/72*     (2013.01)
    *H04L 9/08*     (2006.01)

(56) References Cited

U.S. PATENT DOCUMENTS

| | | | |
|---|---|---|---|
| 10,263,662 | B2 | 4/2019 | Jiang |
| 2006/0274708 | A1 | 12/2006 | Estraviz et al. |
| 2013/0044881 | A1* | 2/2013 | Chang .................. H04L 9/0819 380/278 |
| 2013/0202014 | A1 | 8/2013 | Schmidl |
| 2015/0279378 | A1* | 10/2015 | Craven ............ G11B 20/10527 704/500 |
| 2016/0219024 | A1* | 7/2016 | Verzun .................. H04L 63/102 |
| 2017/0207814 | A1 | 7/2017 | Kobayashi et al. |
| 2022/0014212 | A1* | 1/2022 | Zhang ............... H03M 13/6561 |

OTHER PUBLICATIONS

Wefers, Frank et al., "High-Performance Real-Time Fir-Filtering Using Fast Convolution on Graphics Hardware", Proc of the 13th Int. Conference on Digital Audio Effects (DAFx-10), Graz, Austria, Sep. 6-10, 2010, 8 pages.

\* cited by examiner

OPTIMIZED CONVOLUTION FOR RECEIVED XOR ENCRYPTED DATA STREAMS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/011,899 entitled OPTIMIZED CONVOLUTION FOR RECEIVED XOR ENCRYPTED DATA STREAMS, filed Apr. 17, 2020;
Said U.S. Provisional Patent Application 63/011,899 is herein incorporated by reference in its entirety.

GOVERNMENT SUPPORT

This technology was developed with U.S. government support under contract FA8616-17-C-0005 awarded by the United States Air Force Life Cycle Management Center (AFLCMC). The U.S. government has certain rights in this invention.

TECHNICAL FIELD

The subject matter disclosed by the instant application is directed generally to secure communications and more particularly to the despreading and decoding of received transmission security (TRANSEC) encoded signals.

BACKGROUND

Receiving an XOR-encrypted data stream requires more processing than at the transmission end. For example, multiple key/data alignments accounting for varying transmission latencies must be attempted before the correct alignment can be ascertained. One-to-many spreading schemes may be employed to increase the signal/noise ratio (SNR) of a transmitted signal. However, on the receiving end, despreading and recombining the transmitted bits to recover a lost signal may become a highly processor-intensive correlation operation.

SUMMARY

In a first aspect, a receiver apparatus configured for optimized convolution of received XOR-encrypted data streams is disclosed. In embodiments, the receiver apparatus includes antenna elements for receiving transmission security (TRANSEC) encoded bitstreams over a variable distance, the encoded bitstream spread according to a one-to-many spreading factor S and having an uncertainty window (e.g., output window size) based on the uncertainty of the transmission distance. The receiver includes cryptographic processors for, when the spreading factor S is sufficiently large, selecting a key section number A (e.g., the number of key sections of a TRANSEC decryption key, where A divides S such that a stepsize S/A is always an integer) and data section number B (e.g., a number of data sections of the encoded bitstream, based on the size of the uncertainty window W and the selected key section number A). The cryptographic processors generate output correlation windows for each received bit of the bitstream based on pipelined mirrored-key sectional convolution of the key section number A and data section number B, both selected for optimal performance according to desired parameters.

In some embodiments, the cryptographic processors select fast Fourier transforms (FFT) of a size N, where N is based on the size of the uncertainty window W, the spreading factor S, and the selected key section number A. The output sequence of correlation windows is based on pipelined section convolutions comprising A FFT's of size N and B inverse FFT's (IFFT) of size N.

In some embodiments, the receiver apparatus includes signal processors, such that non-cryptographic operations of the pipelined sectional convolution may be offloaded from the cryptographic processors to the signal processors.

In some embodiments, the cryptographic processors (or signal processors) determine a finite set of all possible A and B (e.g., respectively the key section number and data section number), selecting from this set an optimal key section number A and an optimal data section number B.

In some embodiments, the optimal key section number A and/or optimal data section number B may be selected to minimize usage of the cryptographic processors.

In some embodiments, the receiver apparatus includes a memory for storing the output sequence. For example, the optimal key section number A and/or optimal data section number B may be selected to minimize memory usage for storing the output sequence.

In a further aspect, a method for optimizing the decryption and despreading of a received TRANSEC encoded bitstream is also disclosed. In embodiments, the method includes receiving the TRANSEC encoded bitstream via antenna elements of a receiver apparatus, where the bitstream is spread according to a one-to-many spreading factor S and associated with an output window of size W (based on the uncertainty associated with the transmission distance of the bitstream). The method includes determining, via cryptographic processors of the receiver apparatus, whether the spreading factor S is sufficiently large. The method includes, when S is sufficiently large, selecting (via the cryptographic processors) an optimal key section number A and data section number B based on predetermined performance parameters. The key section number A corresponds to a number of key sections of a decryption key for the encoded bitstream, based on the spreading factor S, and the data section number B corresponds to a number of data sections of the bitstream, based on the output window size W and the key section number A. The method includes generating, via the cryptographic processors, an output sequence of correlation windows (each output window associated with a bit of the encoded bitstream) based on pipelined sectional mirrored-key convolution of the selected key section number A and data section number B.

In some embodiments, the method includes selecting fast Fourier transforms (FFT) of size N based on the uncertainty window size W, the spreading factor S, and the selected key section number A.

In some embodiments, the method includes generating an output sequence of correlation windows based on pipelined sectional convolution of A FFT's of size N and B inverse FFT's (IFFT) of size N.

In some embodiments, the method includes generating the output sequence of correlation windows based on pipelined sectional convolution executed by signal processors in communication with the cryptographic processors.

In some embodiments, the method includes determining a set of all possible key section numbers A and data section numbers B, and selecting from these sets an optimal key section number A and an optimal data section number B.

In some embodiments, the method includes selecting one or more of the optimal key section number A and the optimal data section number B to minimize usage of the cryptographic processors.

In some embodiments, the method includes selecting one or more of the optimal key section number A and the optimal data section number B to minimize memory usage (e.g., for storing the output sequence).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
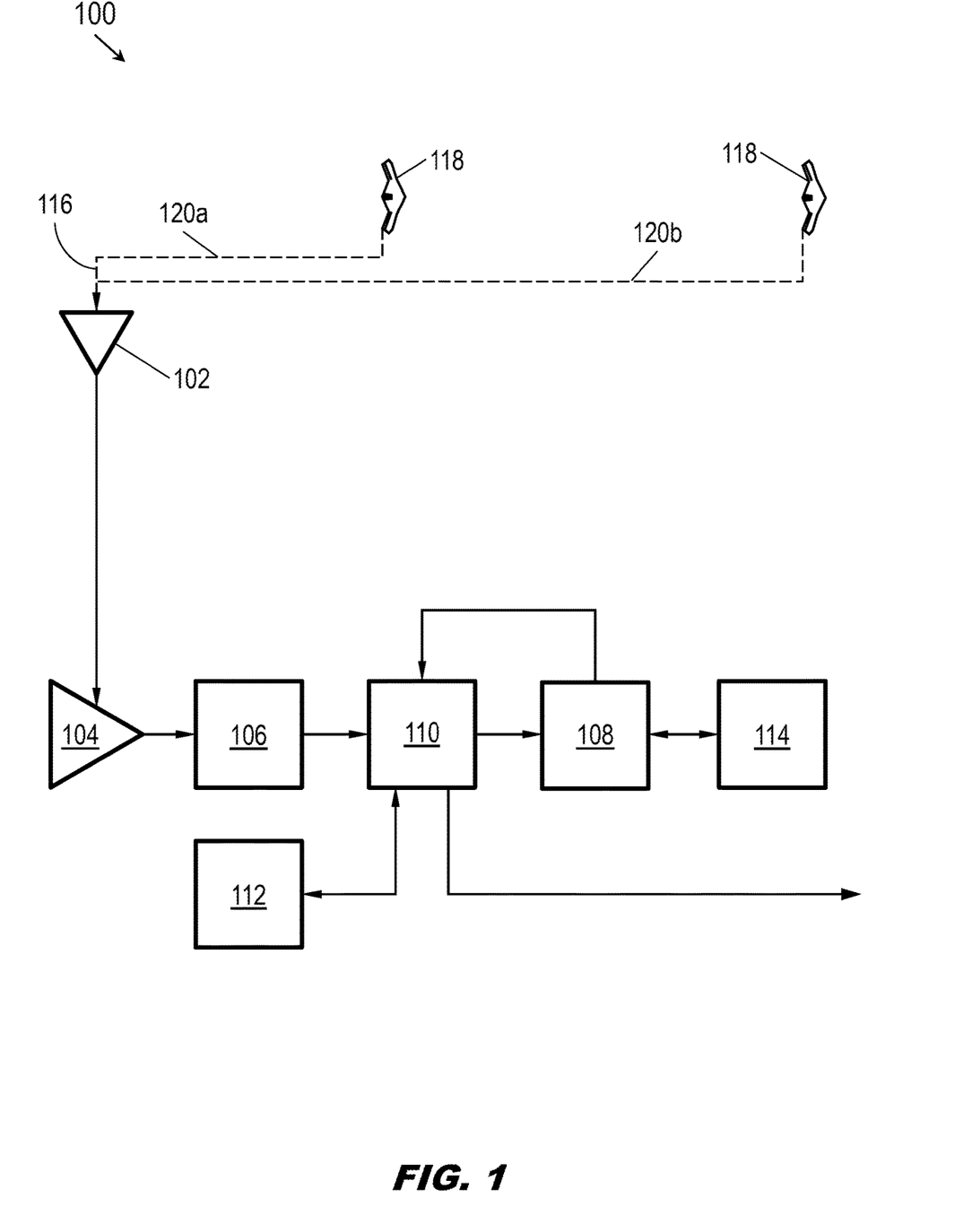
FIG. 1 is a block diagram illustrating a receiver apparatus configured for optimal decryption and despreading of a received bitstream, in accordance with example embodiments of this disclosure.

Referring to FIG. 1, a receiver apparatus 100 is disclosed. The receiver apparatus 100 may include antenna elements 102, signal amplifiers 104, digital tuners 106, cryptographic processors 108, signal processors 110, main memory 112 (e.g., in communication with the signal processors), and cryptographic memory 114.

In embodiments, the receiver apparatus 100 may be configured for optimal despreading and decryption of a received transmission security (TRANSEC) encoded signal 116. For example, the encoded signal 116 may comprise a very low frequency (VLF; e.g., preferably in the range 14-60 kHz) data stream encrypted according to time-synchronized XOR encryption and spread according to a one-to-many spreading scheme (e.g., to increase signal/noise ratio (SNR)). As the source of the encoded signal 116 may be an aircraft 118 or other platform (e.g., mobile or stationary, including ground- or water-based vehicles and fixed transmitting installations), the time delay associated with the received encoded signal may vary according to the variable distance 120a-b of the transmitting source from the receiver apparatus 100.

In embodiments, the encoded signal 116 may be received by antenna elements 102 and further processed (e.g., via signal amplifiers 104 and digital tuners 106) prior to despreading and decryption via the cryptographic processors 108 and decoding via the signal processors 110. For example, the encoded signal 116 may be associated with a predetermined spread factor (e.g., an integer S) and an uncertainty window (e.g., an integer W) large enough to account for any possible propagation delay over the desired range of transmission. The correlation process at the receiving end may be dependent on the spread factor S and uncertainty window W; larger spread factors may result in correlation operations disproportionately draining on the component resources of the receiver apparatus 100 (e.g., the cryptographic processors 108 and/or cryptographic memory 114). For larger spread factors S (and corresponding encryption key sizes), the receiver apparatus 100 may employ mirrored-key pipelined sectional convolution instead of standard correlation, optimizing resource usage with respect to the cryptographic processors 108, the cryptographic memory 114, or both (e.g., a balanced approach). In some embodiments, non-cryptographic operations (as described in greater detail below) may be offloaded from the cryptographic processors 108 to the signal processors 110.

Figure 2A:
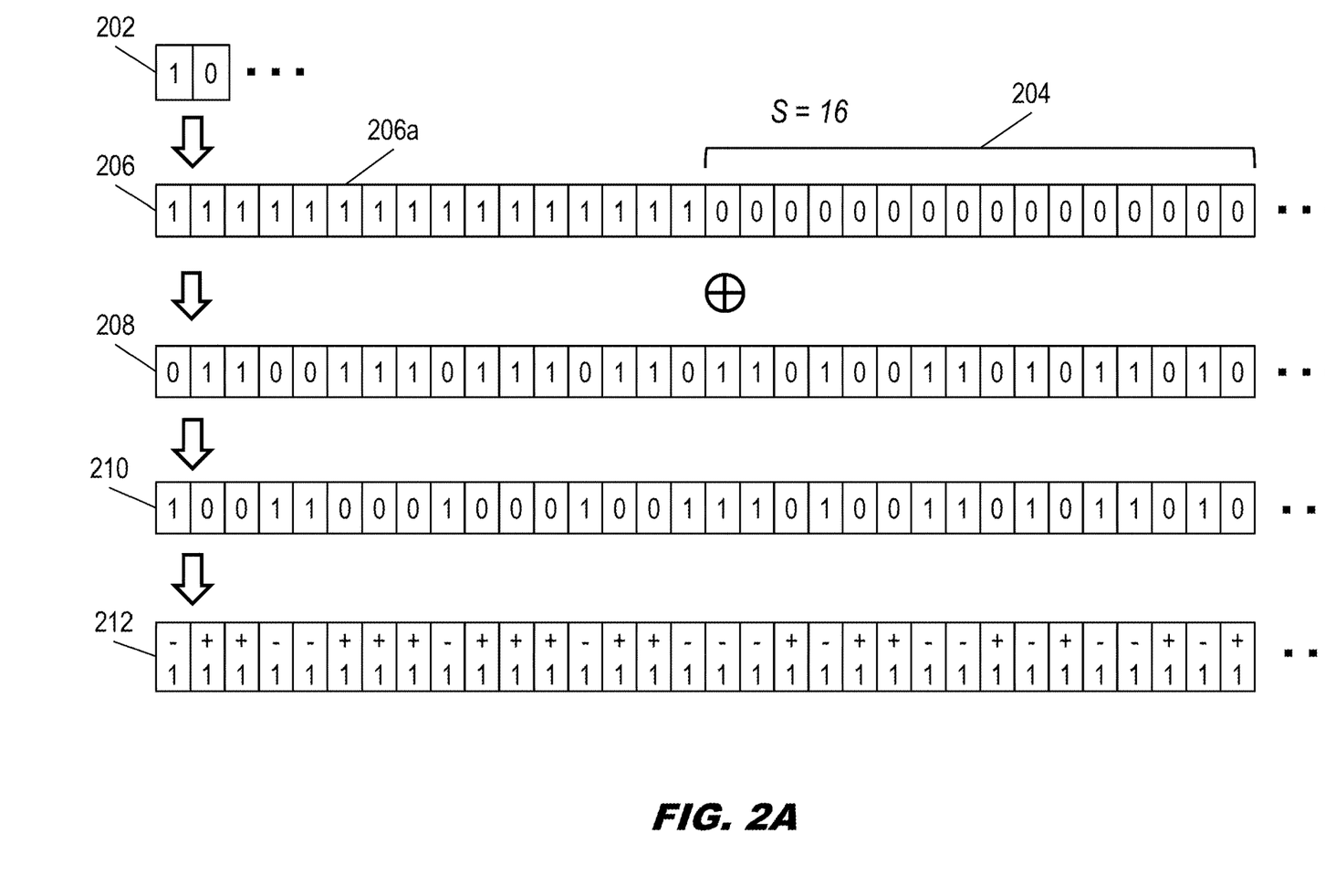
FIGS. 2A and 2B are diagrammatic illustrations of encoding and decoding processes associated with the receiver apparatus of FIG. 1.
Figure 2B:
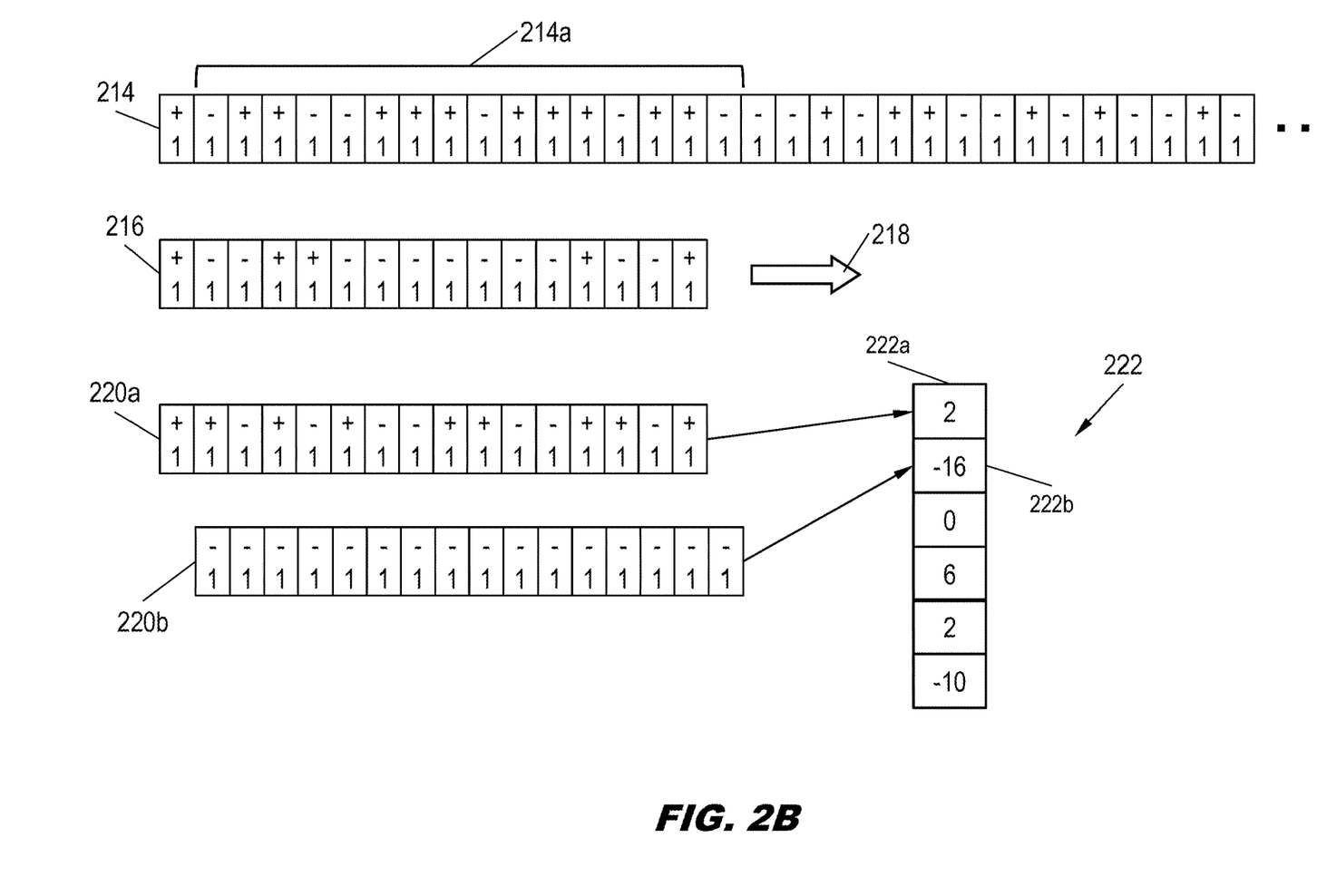

Referring to FIGS. 2A and 2B, encoding and decoding operations of the transmission source and receiver apparatus 100 are disclosed.

In embodiments, referring in particular to FIG. 2A, transmission security (TRANSEC) encoding may be applied to a bitstream 202 at the transmitter end (e.g., aircraft 118, FIG. 1). For example, the bitstream 202 may be spread via a one-to-many spreading scheme according to a spread factor S (204). For example, the spread factor 204 may be S=16, resulting in a spread bitstream 206 comprising S spread bits 206a for each bit of the bitstream 202. An exclusive disjunction (XOR) encryption key (208) of size S (e.g., finite impulse response (FIR) filter size) per spread bit 206a, may be applied to the spread bitstream 206, and the XOR-encoded spread bitstream 210 translated into transmitted soft decision values 212 (e.g., floating point multiplications as opposed to bitwise XOR).

In embodiments, referring also to FIG. 2B, the received soft decision values 214 may be extracted from the bitstream carried by the modulated received encoded signal (116, FIG. 1) by the cryptographic processors (108, FIG. 1). A decoding key 216 corresponding to the first bit of the bitstream 202 and of a size S corresponding to the spread factor 204 may be applied to the received soft decision values 214a corresponding to the first bit, sliding forward (218) until an optimal correlation window (corresponding to a correct time alignment) is found. For example, the decoded soft decision values 220a-b may correspond to two adjacent positions of the decoding key 216; each set of decoded soft decision values may sum to a correlation window output 222a-b of the set of correlation window outputs 222 corresponding to the first bit. In embodiments, the decoded soft decision values 220b may correspond to a correct time alignment and thus the strongest possible value for recovery. For example, the optimal magnitude (−16) indicated by the second decoded soft decision value 220b may indicate a high likelihood that the transmitted soft decision values (212, FIG. 2A) start at the second bit of the received soft decision values 214.

Figure 3A:
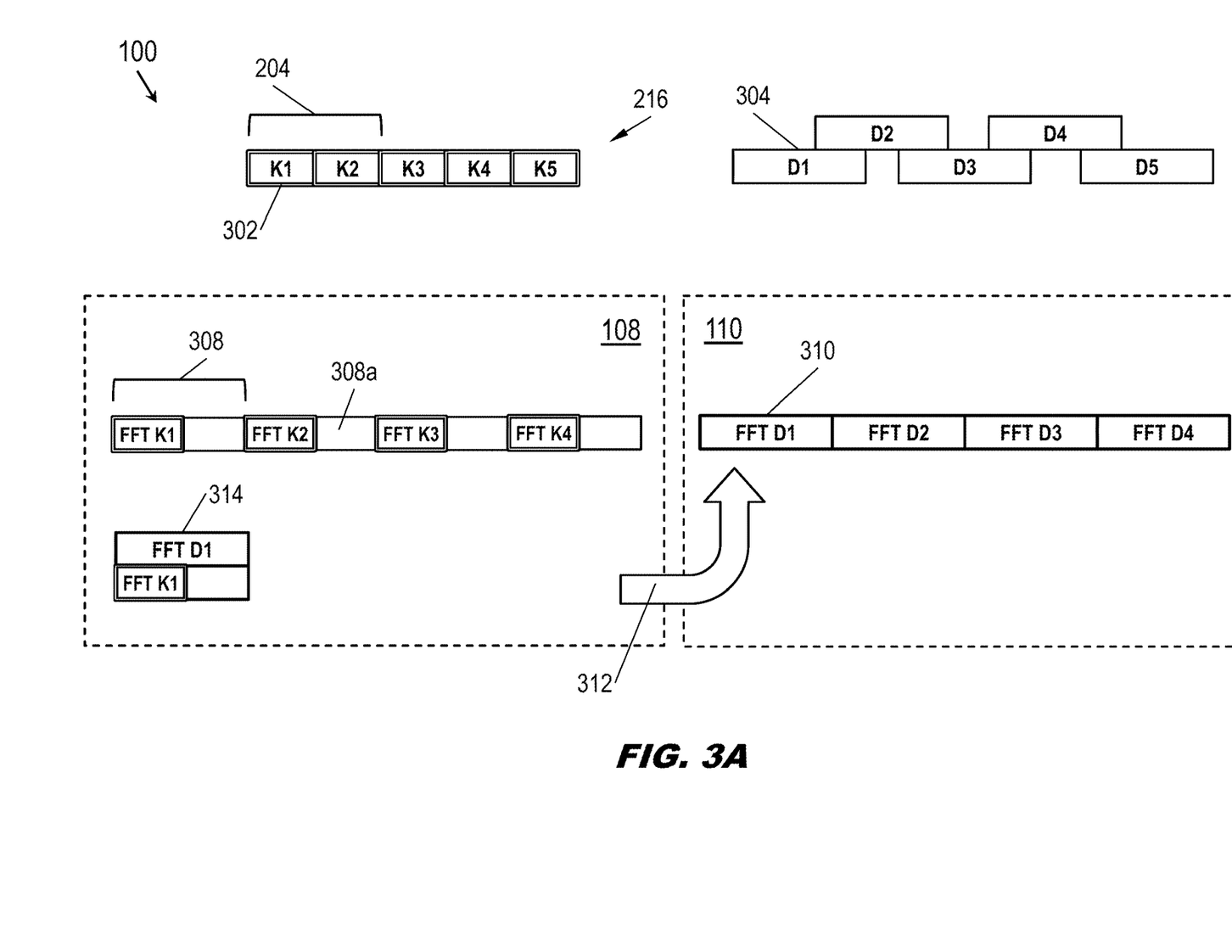
FIGS. 3A and 3B are diagrammatic illustrations of pipelined sectional convolution operations of the receiver apparatus of FIG. 1.
Figure 3B:
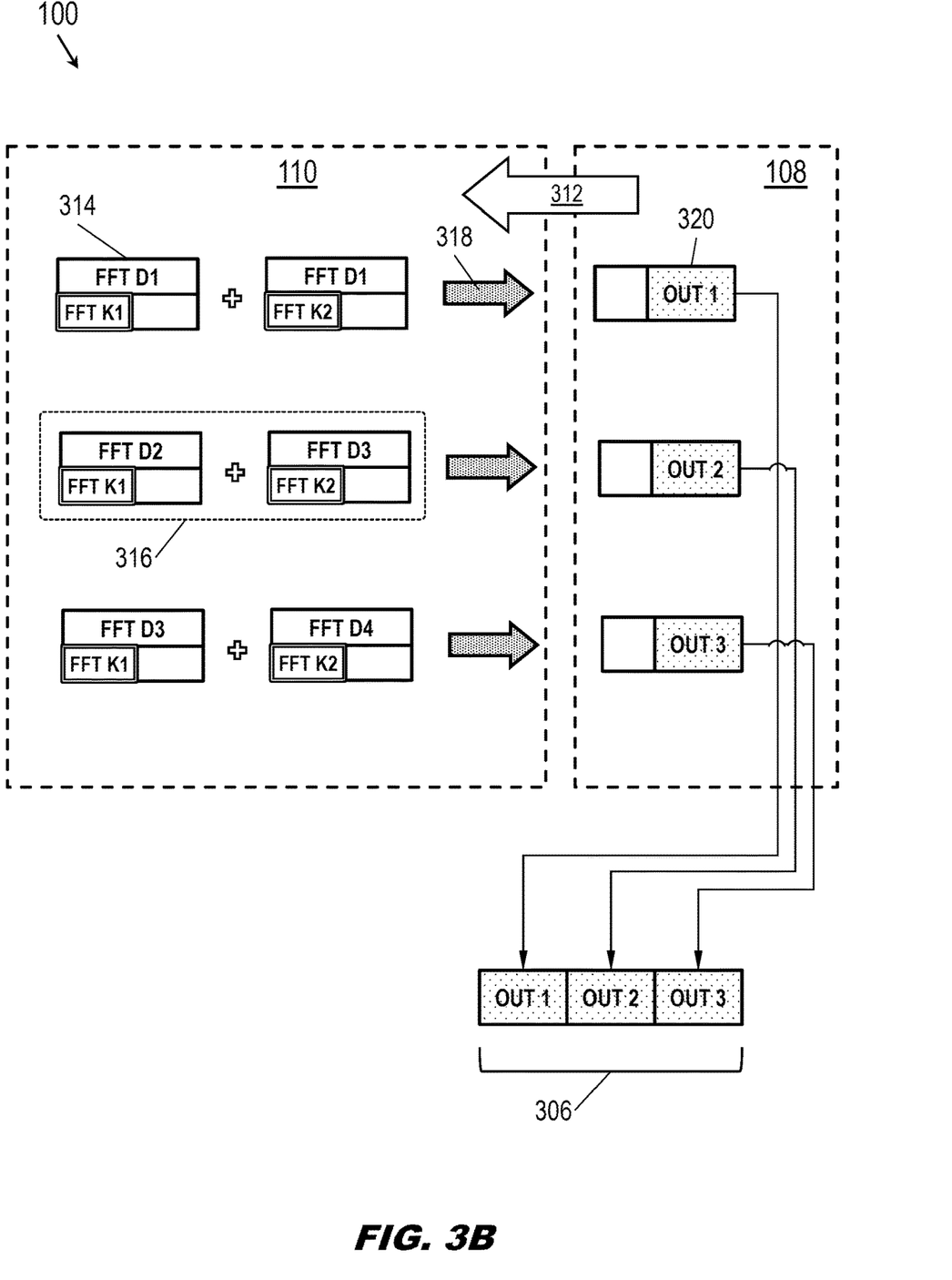

Referring to FIGS. 3A and 3B, pipelined sectional convolution operations of the receiver apparatus 100 are shown.

In embodiments, the cryptographic processors 108 may set a spreading threshold such that, for sufficiently large spread factors S (204), correlation operations associated with the despreading and decryption of the encoded signal (116, FIG. 1) may be replaced with mirrored-key FFT convolution operations. For example, given an encoded signal 116 with spread factor S and uncertainty window W, there may be a set of possible A and B, where A and B are integers such that A is a number of key sections 302 (e.g., key sections K1, K2, . . . of the decoding key 216, where K(i) is the key at the i-th position (e.g., each key section K(i) having S/A keybits) and B is a number of data sections 304 (e.g., overlapping data sections D1, D2, . . . of the received soft decision values (214, FIG. 2B), where D(i) is the data at the i-th position) and each adjacent pair of data sections 304 overlapped by S/A elements. In some embodiments, the number B of data sections 304 may be expressed as B=ceil ((W−1)/(N−S/A)).

In embodiments, the cryptographic processors 108 may select a fast Fourier transform (FFT) size N, where N is an integer such that N>S/A. For example, given a particular spread factor S and uncertainty window W, for each possible number A of key sections 302, number B of data sections 304, and FFT size N, a pipelined output 306 may be calculated (e.g., via the cryptographic processors 108) via:

A real key FFTs (308) of size N, (S/A keybits, zero padded to size N) (308a);

A complex data FFTs (310) of size N (e.g., which may be offloaded (312) to the signal processors 110);—

(A*B*N) elementwise complex multiplications (314);

(A−1)*(B*N) elementwise complex additions (316); and

B complex output Inverse FFTs (318) (IFFT) of size N (e.g., the complex additions 316 and IFFTs 318 similarly offloadable (312) to the signal processors 110)

compared to (2*S*W) real multiplications and (2*S*W) real additions required for a standard correlation. For example, a selection of A=2 and B=3 may result in 2 real key FFTs 308, 2 complex data FFTs 310, 6N elementwise complex multiplications 314, 3N elementwise complex additions 316, and 3 complex output IFFTs 318, resulting in a pipelined output 306 having a width equivalent to W (e.g., the size of the uncertainty window), corresponding to a correlation window (222, FIG. 2B), and comprising B=3 output chunks 320 of ~W/3 elements each.

By way of another non-limiting example, if A=1 and B=4, then for key section K1 (302) and data sections D1, D2, D3, D4 (304), where K(i)×D(i) represents an elementwise complex multiplication 314, and where Chunky represents an output chunk 320:

K1 × D1 → IFFT (K1 × D1) → Chunk$_1$ (~W/4 elements);
K1 × D2 → IFFT (K1 × D2) → Chunk$_2$ (~W/4 elements);
K1 × D3 → IFFT (K1 × D3) → Chunk$_3$ (~W/4 elements);
K1 × D4 → IFFT (K1 × D4) → Chunk$_4$ (~W/4 elements).

However, if A=2 and B=4, each output chunk 320 is an elementwise complex addition 316 of two elementwise complex multiplications 314, and prior FFTs (308, 310) may be reused. For example:

| K1 | K2 | | |
|---|---|---|---|
| D1 | D2 | (K1 × D1) + (K2 × D2) | IFFT [(K1 × D1) + (K2 × D2)] |
| D2 | D3 | (K1 × D2) + (K2 × D3) | IFFT [(K1 × D2) + (K2 × D3)] |
| D3 | D4 | (K1 × D3) + (K2 × D4) | IFFT [(K1 × D3) + (K2 × D4)] |
| D4 | D5 | (K1 × D4) + (K2 × D5) | IFFT [(K1 × D4) + (K2 × D5)] |

In embodiments, as noted above, for any given pair S and W, there may be many possible combinations of A, B, and N. In embodiments, the cryptographic processors 108 may calculate a variety of parameters (e.g., utilization of the cryptographic processors 108, utilization of the cryptographic memory 114) for each possible A, B, and N and select an A, B, and N to optimize performance of the receiver apparatus 100 in one or more specific ways. For example, the signal processors 110 may select A, B, and N to optimize (e.g., minimize) usage of the cryptographic processors 108 themselves; to minimize usage of the cryptographic memory 114; or to balance conservation of processor and memory usage. In embodiments, the calculation and/or selection of A, B, N may be predetermined based on the chosen parameters; alternatively, in some embodiments these selections may be made at runtime.

By way of a non-limiting example, for an XOR encryption key/FIR filter (208, FIG. 2A) of size 230 and a correlation window/pipelined output 306 of size W 100, the utilization of memory 112 may be relative to (2+B)*N (e.g., where N=FFT size). By selecting A=1 and B=1 and FFT size N=512, W (1*(512−230/1)+1)=281 (overcalculating W by ~181 samples); this approach would utilize ~65% of equivalent correlation processing and result in very high memory usage (1536). A better choice with respect to CPU utilization (e.g., the signal processors 110) might be A=5, B=6, and N=64, where W (6*(64−230/5)+1)=109 (overcalculating by only 9 samples); here processing is only ~41% of the correlation equivalent and memory usage ~512. Similarly, the signal processors 110 may choose to optimize memory usage by selecting A=46, B=9, and N=16, such that W (9*(16−230/46)+1)=100 (no overcalculation); while CPU usage is ~72% of correlation equivalent, memory usage is highly efficient (~176).

Figure 4:
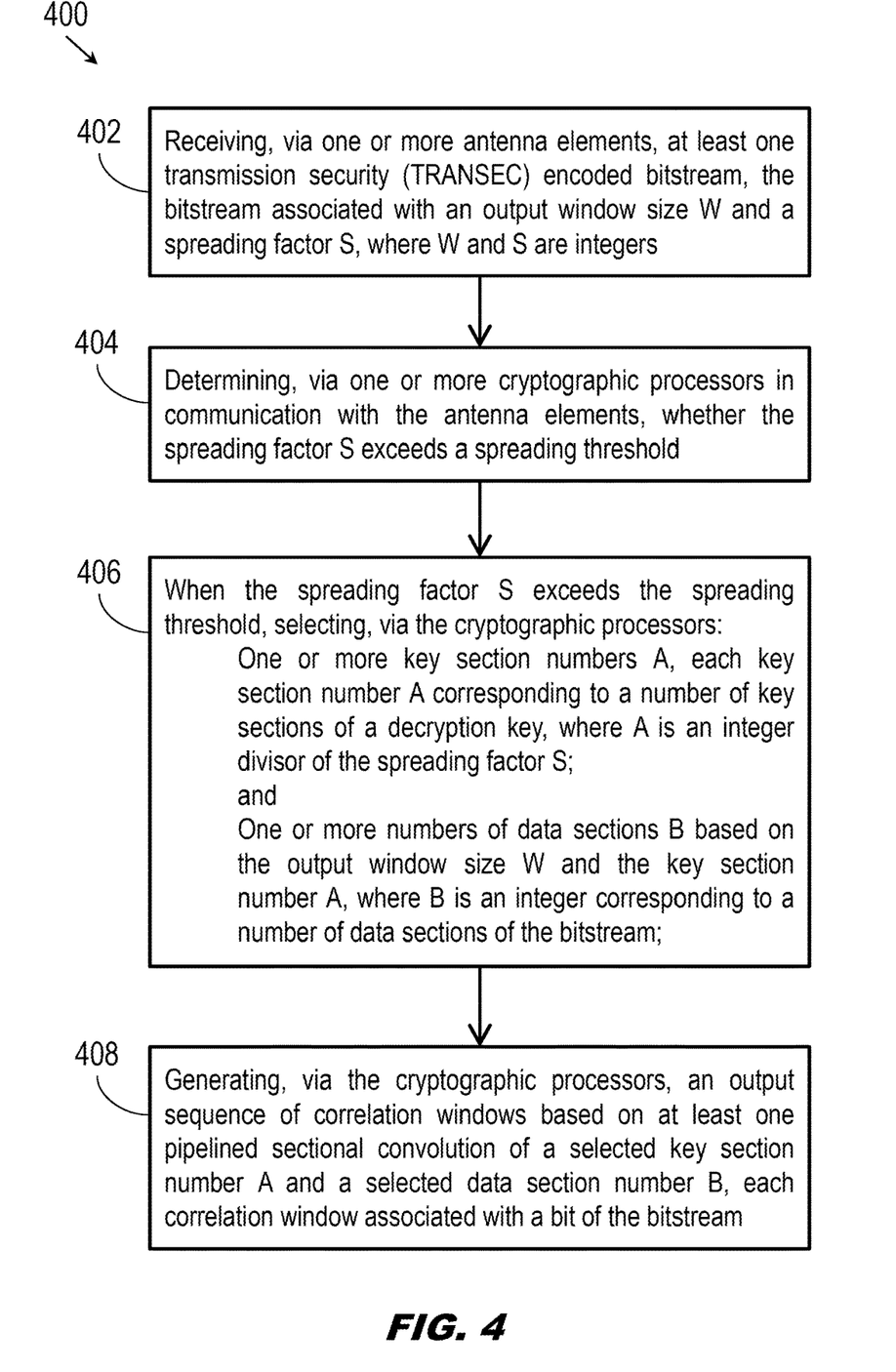
FIG. 4 is a flow diagram illustrating a method for optimizing the decryption and despreading of a received bitstream in accordance with example embodiments of this disclosure.

Referring now to FIG. 4, the method 400 may be implemented by the receiver apparatus 100 and may include the following steps.

At a step 402, antenna elements of the receiver apparatus receive a transmission security (TRANSEC) encoded bitstream, the bitstream associated with an output window size W (e.g., uncertainty window) and a one-to-many spreading factor S, where W and S are integers.

At a step 404, cryptographic processors in communication with the antenna elements determine whether the spreading factor S exceeds a spreading threshold.

At a step 406, if S is sufficiently large to exceed the spreading threshold, the cryptographic processors select 1) a key section number A (e.g., corresponding to A key sections of a decoding/decryption key), where A divides S without remainder resulting in a stepsize S/A; and 2) a data section number B based on the output window size W and key section number A, and B corresponds to B data sections of the bitstream. For example, the cryptographic processors may also select a fast Fourier transform (FFT) size N based on the output window size W, the spreading factor S, and the key section number A. The cryptographic processors may first determine all possible A and B, and select therefrom an optimal A and B depending on resource conservation priorities. For example, the optimal A and B may be chosen to minimize processor usage, or to minimize memory usage, or to balance processor and memory conservation.

At a step 408, the cryptographic processors generate an output sequence of correlation windows based on a pipelined sectional mirrored-key convolution of the key section number A and the data section number B, where each correlation window is associated with a bit or symbol of the bitstream. For example, the pipelined sectional mirrored-key convolution may include A fast Fourier transforms (FFT), each of size N, and B inverse fast Fourier transforms (IFFT) of size N. In some embodiments, some pipelined sectional mirrored-key convolution operations (e.g., IFFT operations) may be offloaded from the cryptographic processors to signal processors of the receiver apparatus.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A receiver apparatus, comprising:
   at least one antenna element configured to receive at least one transmission security (TRANSEC) encoded bitstream, the bitstream associated with an output window size W and a spreading factor S, where W and S are integers; and
   one or more cryptographic processors configured to, when the spreading factor S exceeds a spreading threshold:
      select one or more key section numbers A, each key section number A corresponding to a number of key sections of a decryption key, where A is an integer divisor of the spreading factor S;
      select one or more data section numbers B based on the output window size W and the selected key section number A, where B is an integer corresponding to a number of data sections of the bitstream; and
      generate an output sequence of correlation windows based on at least one pipelined sectional convolution of the selected key section number A and the selected data section number B, each correlation window associated with a bit of the bitstream.

2. The receiver apparatus of claim 1, wherein the one or more cryptographic processors are configured to:
   select one or more fast Fourier transforms (FFT) corresponding to a size N based on at least one of a group including the output window size W, the spreading factor S, and the selected key section number A, where N is an integer; and
   generate the output sequence of correlation windows based on at least one pipelined sectional convolution comprising A fast Fourier transforms of size N and B inverse fast Fourier transforms of size N, wherein A is the selected key section number and B is the selected data section number.

3. The receiver apparatus of claim 2, further comprising:
   one or more signal processors in communication with the one or more cryptographic processors,
   the at least one pipelined sectional convolution including at least one operation executed by the one or more signal processors.

4. The receiver apparatus of claim 2, wherein the one or more cryptographic processors are configured to generate the output sequence of correlation windows based on at least one pipelined sectional convolution comprising at least one of:
   A real key fast Fourier transforms of size N; or A complex data fast Fourier transforms of size N;
wherein A is the selected key section number.

5. The receiver apparatus of claim 1, wherein the one or more cryptographic processors are configured to:
   determine a finite set of all possible key section numbers and all possible data section numbers; and
   select from the determined finite set of all possible key section numbers and all possible data section numbers 1) an optimal key section number A and 2) an optimal data section number B.

6. The receiver apparatus of claim 5, wherein the one or more cryptographic processors are configured to select one or more of the optimal key section number A and the optimal data section number B to minimize usage of the one or more cryptographic processors.

7. The receiver apparatus of claim 5, further comprising:
   at least one memory operatively coupled to the one or more cryptographic processors, the memory configured to store the output sequence; and
   the one or more cryptographic processors are configured to select one or more of the optimal key section number A and the optimal data section number B to minimize a portion of the memory corresponding to the storing of the output sequence.

8. A method for optimizing a decryption and despreading of a received bitstream, the method comprising:
   receiving, via one or more antenna elements, at least one transmission security (TRANSEC) encoded bitstream, the bitstream associated with an output window size W and a spreading factor S, where W and S are integers;
   determining, via one or more cryptographic processors in communication with the antenna elements, whether the spreading factor S exceeds a spreading threshold;
   when the spreading factor S exceeds the spreading threshold, selecting, via the one or more cryptographic processors:
      one or more key section numbers A, each key section number A corresponding to a number of key sections of a decryption key, where A is an integer divisor of the spreading factor S; and
      one or more data section numbers B based on the output window size W and the selected key section number A, where B is an integer corresponding to a number of data sections of the bitstream; and
   generating, via the one or more cryptographic processors, an output sequence of correlation windows based on at least one pipelined sectional convolution of the selected key section number A and the selected data section number B, each correlation window associated with a bit of the bitstream.

9. The method of claim 8, wherein, selecting, via the one or more cryptographic processors, one or more key section numbers A and one or more data section numbers B includes:
   selecting, via the one or more cryptographic processors, one or more fast Fourier transforms (FFT) corresponding to a size N based on at least one of a group including the output window size W, the spreading factor S, and the selected key section number A, where N is an integer.

10. The method of claim 9, wherein generating, via the one or more cryptographic processors, an output sequence of correlation windows based on at least one pipelined sectional convolution of the selected key section number A and the selected data section number B, includes:
   generating, via the one or more cryptographic processors, an output sequence of correlation windows based on at least one pipelined sectional convolution comprising A fast Fourier transforms of size N and B inverse fast Fourier transforms of size N, wherein A is the selected key section number and B is the selected data section number.

11. The method of claim 10, wherein generating, via the one or more cryptographic processors, an output sequence of correlation windows based on at least one pipelined sectional convolution comprising A fast Fourier transforms of size N and B inverse fast Fourier transforms of size N, wherein A is the selected key section number and B is the selected data section number, includes:
   generating, via the one or more cryptographic processors, an output sequence of correlation windows based on at least one pipelined sectional convolution, the pipelined sectional convolution including at least one operation executed by one or more signal processors in communication with the one or more cryptographic processors.

12. The method of claim 10, wherein the at least one pipelined sectional convolution comprises at least one of:
   A real key fast Fourier transforms of size N; or
   A complex data fast Fourier transforms of size N;
   wherein A is the selected key section number.

13. The method of claim 8, wherein generating, via the one or more cryptographic processors, an output sequence of correlation windows based on at least one pipelined sectional convolution of the selected key section number A and the selected data section number B includes:
   determining a first set of all possible key section numbers;
   determining a second set of all possible data section numbers;
   selecting from the first set of all possible key section numbers an optimal key section number A; and
   selecting from the second set of all possible data section numbers an optimal data section number B.

14. The method of claim 13, wherein:
   selecting from the first set of all possible key section numbers the optimal key section number A includes selecting the optimal key section number A to minimize usage of the one or more cryptographic processors; and
   wherein selecting from the second set of all possible data section numbers the optimal data section number B includes selecting the optimal data section number B to minimize usage of the one or more cryptographic processors.

15. The method of claim 13, wherein:
   selecting from the first set of all possible key section numbers the optimal key section number A includes selecting the optimal key section number A to minimize memory usage; and
   wherein selecting from the second set of all possible data section numbers the optimal data section number B includes selecting the optimal data section number B to minimize memory usage.

* * * * *